United States Patent
Acker et al.

(10) Patent No.: US 11,851,359 B2
(45) Date of Patent: Dec. 26, 2023

(54) DEVICE FOR RESHAPING A GLASS PRODUCT

(71) Applicants: Gerresheimer Regensburg GmbH, Regensburg (DE); Gerresheimer Bünde GmbH, Bünde (DE)

(72) Inventors: Wolfram Acker, Kiel (DE); Richard Kiener, Oberviechtach (DE); Vladislav Löpp, Bünde (DE)

(73) Assignees: Gerresheimer Regensburg GmbH, Regensburg (DE); Gerresheimer Bünde GmbH, Bünde (DE)

( * ) Notice: Subject to any disclaimer, the term of this patent is extended or adjusted under 35 U.S.C. 154(b) by 94 days.

(21) Appl. No.: 17/338,410

(22) Filed: Jun. 3, 2021

(65) Prior Publication Data
US 2021/0380458 A1    Dec. 9, 2021

(30) Foreign Application Priority Data
Jun. 4, 2020   (DE) .......................... 102020114880.1

(51) Int. Cl.
| C03B 23/055 | (2006.01) |
| C03B 23/045 | (2006.01) |
| C03B 23/08  | (2006.01) |

(52) U.S. Cl.
CPC .......... C03B 23/055 (2013.01); C03B 23/045 (2013.01); C03B 23/08 (2013.01)

(58) Field of Classification Search
CPC .... C03B 23/045; C03B 23/055; C03B 23/095
See application file for complete search history.

(56) References Cited

U.S. PATENT DOCUMENTS

| 5,300,134 A * | 4/1994 | Mannl ................... C03B 23/112 |
| | | 65/282 |
| 2005/0183484 A1* | 8/2005 | Arai ....................... B21D 22/16 |
| | | 72/83 |
| 2006/0267250 A1 | 11/2006 | Gerretz et al. |
| 2010/0062350 A1* | 3/2010 | Abe .................... G03F 7/70783 |
| | | 430/5 |

(Continued)

FOREIGN PATENT DOCUMENTS

| CN | 108423975 | 8/2018 |
| DE | 102009031689 | 12/2010 |

(Continued)

OTHER PUBLICATIONS

European Searc Report dated Sep. 29, 2021 in corresponding European Application No. 21176208.

*Primary Examiner* — Galen H Hauth
*Assistant Examiner* — Steven S Lee
(74) *Attorney, Agent, or Firm* — Leydig, Voit & Mayer, Ltd.

(57) ABSTRACT

The invention relates to a device for reshaping a rotating glass intermediate, in particular a glass tube, comprising at least one shaping roller, which is translationally displaceable into a shape-rolling contact with the glass intermediate for shaping, and comprising at least one linear motor for the translational positioning of the at least one shaping roller in such a way that the shaping roller directly follows a translational positioning movement of the translator of the linear motor.

19 Claims, 7 Drawing Sheets

(56) References Cited

U.S. PATENT DOCUMENTS

| | | | |
|---|---|---|---|
| 2012/0297828 A1* | 11/2012 | Bailey | C03B 23/0258 165/172 |
| 2014/0041413 A1* | 2/2014 | Bartsch | C03B 23/055 65/102 |
| 2015/0064779 A1* | 3/2015 | Schultz | G01B 11/08 264/40.1 |
| 2015/0114043 A1* | 4/2015 | Risch | C03B 23/045 65/374.13 |
| 2019/0162524 A1* | 5/2019 | Hepburn | G01B 11/08 |
| 2020/0123038 A1* | 4/2020 | Jud | C03B 23/055 |

FOREIGN PATENT DOCUMENTS

| | | | | |
|---|---|---|---|---|
| EP | 0475047 A2 | | 3/1992 | |
| EP | 1725501 B1 | * | 5/2008 | ........... C03B 23/095 |
| JP | H0421531 A | * | 1/1992 | ........... C03B 23/095 |
| JP | 2002012434 A | * | 1/2002 | ........... C03B 23/045 |

\* cited by examiner

DEVICE FOR RESHAPING A GLASS PRODUCT

CROSS-REFERENCE TO RELATED APPLICATIONS

This application claims the benefit of German Application No. 10 2020 114880.1, filed Jun. 4, 2020, which is hereby incorporated by reference in its entirety.

BACKGROUND OF THE INVENTION

The present invention relates to a device for reshaping a rotating glass intermediate, in particular a glass tube. The invention furthermore relates to a system for producing a glass product, such as a glass syringe, a glass carpule, a glass vial, or a glass ampoule, comprising a receptacle for rotatably holding a glass intermediate, in particular a glass tube, and a device for reshaping the glass intermediate. The invention furthermore relates to a glass product produced with such a system or device.

Glass products, such as glass syringes, glass carpules, glass vials, or glass ampoules, are subject to very low manufacturing tolerances so that on the one hand, a high product quality can be ensured and on the other hand, the partially standardized interfaces, for example in the funnel-shaped end section, can be maintained. In particular, a dimensional accuracy of the final contour of 0.03 mm may be required for a plastic component to be reliably fastened to a glass product. In particular, a dimensional accuracy of the final contour of 0.03 mm may be required for realizing an automatic mounting of plastic components on glass products.

In addition, there is a need to reduce the required production time (cycle time) of glass products.

For the production of glass products, it is known to heat glass intermediates to temperatures above the transformation temperature and to reshape them to form the glass product by pressing a shaping roller against the glass intermediate surface.

EP 0 475 047 A2 proposes driving a threaded rod via a rotating motor. Via the rotation of the threaded rod, a carriage is moved translationally, to which a shaping roller is fastened via a pneumatic cylinder in order to move the shaping roller via the rotating motor relative to the glass intermediate.

However, it has been found that the cycle times cannot be reduced sufficiently with such solutions to reduce production costs and production times as desired. Furthermore, there is a need to simplify the construction of the drive for the shaping roller.

BRIEF SUMMARY OF THE INVENTION

The object of the present invention is to overcome the disadvantages of the known prior art, in particular to provide a device with which shorter cycle times can be achieved, in particular wherein the complexity of the device is to be reduced and/or the dimensional accuracy of the glass products achieved with the device is not to be adversely affected, preferably is to be increased in particular up to a dimensional accuracy of 0.1 mm or 0.03 mm.

This object is achieved by the features of the independent claim.

The invention relates to a device for reshaping a rotating glass intermediate, in particular a glass tube. The term "rotating glass intermediate" refers in particular to a glass intermediate rotating about the longitudinal axis of the glass intermediate. The term "longitudinal axis of the glass intermediate" refers in particular to the rotational axis, in particular the rotational symmetry axis, of the glass intermediate. In a glass tube, the longitudinal axis of the glass intermediate is in particular the central axis, in particular the rotational symmetry axis, of the glass tube.

The glass intermediate can be rotated, in particular, by a receptacle about a receptacle rotational axis, which rotatably holds the glass intermediate. It is to be understood that the receptacle is not an essential part of the present invention. Essential parts of the present invention are the at least one shaping roller described below and the at least one linear motor described below. The device may be a shaping device. In particular, the device can be suitable for use in the system described below for producing an in particular rotationally symmetrical glass product, such as a glass syringe, a glass carpule, a glass vial, or a glass ampoule. Below, the device is also referred to as a shaping device and comprises the at least one shaping roller described below as well as the at least one linear motor described below. The shaping device does not necessarily comprise the receptacle described above and below for rotatably holding the glass intermediate. The receptacle for rotatably holding the glass intermediate can in particular be formed in a separate device. In particular, the receptacle can be formed in a carousel, which can conduct the receptacle to a working area of the shaping device and away from it again. However, the invention is described below in part by way of example on the basis of one of the systems which has both the shaping device, with the at least one shaping roller and with the at least one linear motor, and the receptacle described above and below.

According to the invention, the device comprises at least one shaping roller, which is translationally displaceable into a shape-rolling contact with the glass intermediate for shaping. In particular, the at least one shaping roller comprises two or more shaping rollers, which can be displaced translationally into a shape-rolling contact with the glass intermediate for shaping. Insofar as embodiments are described below in connection with a shaping roller, they can also be applied to the embodiment with two or more shaping rollers in such a way that each of the shaping rollers has the described features.

In order to be able to provide a shape-rolling contact with the glass intermediate, the shaping roller is rotatable in particular about a roller rotational axis. If an embodiment with two or more shaping rollers is concerned, each shaping roller can be rotatably mounted about a separate roller rotational axis. If features are described below in relation to the roller rotational axis, they must merely be embodied in relation to one of the roller rotational axes. Preferably, however, such features are embodied in relation to each roller rotational axis. In particular, the roller rotational axes of each shaping roller can extend in parallel to one another. In particular, the roller rotational axis extends substantially in a horizontal plane. In this context, "substantially" means, in particular, that the roller rotational axis is inclined relative to the horizontal plane by a maximum of 1°, 5°, 10°, or 20°.

In the context of the present invention, the term "axial direction" refers in particular to the direction which extends along, in particular in parallel to, the roller rotational axis, in particular in shape-rolling contact. Alternatively or additionally, the term "axial direction" may refer to the direction which extends along, in particular in parallel to, the receptacle rotational axis, in particular in shape-rolling contact. The term "extent of the axial direction along the roller rotational axis or the receptacle rotational axis" in particular means that an axis defined the axial direction is inclined by a maximum of 1°, 5°, 10°, or 20°, to the roller rotational axis or to the receptacle rotational axis.

In the context of the present invention, the term "radial direction" refers in particular to the directions extending transversely, in particular radially or orthogonally, to the roller rotational axis and/or the receptacle rotational axis, in particular in shape-rolling contact. The term "extent of the radial direction transverse to the roller rotational axis or the receptacle rotational axis" in particular means that axes defining the radial direction are inclined by a maximum of 1°, 5°, 10°, or 20°, to a plane extending orthogonally to the roller rotational axis.

In the context of the present invention, the term "circumferential direction" refers in particular to the circumferential direction with respect to the roller rotational axis or the receptacle rotational axis.

For the rotatable design of the shaping roller, it can be rotatably mounted about the roller rotational axis via a radial bearing. The radial bearing can support the shaping roller in the radial direction relative to the roller rotational axis. In addition, the radial bearing can support the shaping roller in the axial direction relative to the roller rotational axis so that the shaping roller has only one degree of freedom of movement relative to the radial bearing, namely in the circumferential direction about the roller rotational axis.

The shaping roller can be freely rotatably mounted. In particular, the shaping roller can be formed as an idling shaping roller. Alternatively, the device may have at least one roller motor for driving the at least one shaping roller. In one embodiment with a roller motor, the radial bearing of the shaping roller can be formed by a radial bearing, in particular a radial bearing of the motor.

The term "shaping" refers in particular to the reshaping of a glass intermediate to form a glass product. The reshaping can consist of a plurality of shaping steps or of a single shaping step. In the preferred embodiment of the system described below, the shaping takes place in four shaping steps each with separate shaping devices. For shaping, the shaping roller is brought into shape-rolling contact with the glass intermediate. The term "shape-rolling contact" refers to the contact surface between the shaping roller and the glass intermediate. In particular, the shaping roller exerts a reshaping force on the glass intermediate in shape-rolling contact. The reshaping force can act in particular in the radial direction in order to deform the glass intermediate in the radial direction. Alternatively or additionally, the reshaping force may act on the glass intermediate in the axial direction for glass mass compensation. In shape-rolling contact, the shaping roller rolls in particular over the glass surface of the glass intermediate. In shape-rolling contact, the shaping roller in particular rotates about the roller rotational axis. In particular, the glass intermediate rotates in shape-rolling contact about a longitudinal axis, in particular a rotational axis, of the glass intermediate and/or about the receptacle rotational axis. In particular, the longitudinal axes of the glass intermediate, in particular the receptacle rotational axis, and the roller rotational axis extend in parallel to one another in shape-rolling contact.

The shaping roller can be substantially cylindrical. The term "substantially cylindrical" refers in particular to shaping rollers whose lateral surfaces are perfectly cylindrical or whose lateral surfaces taper conically toward the shaping roller rotational axis by a maximum of 1°, 3°, or 5°. Alternatively, the shaping roller may have a steep cone shape. The term "steep cone shape" in particular means that the lateral surface of the shaping roller tapers conically by more than 5°, 7°, or 10° and less than 12°, 15°, or 20° degrees toward the roller rotational axis. Alternatively, the shaping roller may have a shallow cone shape. The term "shallow cone shape" in particular means that the lateral surface of the shaping roller tapers conically by more than 20°, 30°, or 40° degrees toward the roller rotational axis. In particular, the shaping roller can have, on its end section facing the linear motor and/or roller motor described below in the axial direction, an in particular annular shoulder projecting in the shape of a disk in the radial direction beyond the lateral surface of the shaping roller.

The shaping roller is translationally displaceable into shape-rolling contact. This in particular means that shape-rolling contact can be produced and released again by translational displacement of the shaping roller. In particular, the shaping roller can be displaced purely translationally.

In particular, the shaping roller can be displaced along a feed axis. In particular, the shaping roller can be displaceable along a radial feed axis. A radial feed axis is in particular a feed axis extending in the radial direction, in particular a feed axis extending transversely, in particular orthogonally and/or radially, to the roller rotational axis. Alternatively or additionally, the shaping roller may be displaceable along an axial feed axis. An axial feed axis is in particular a feed axis extending in the axial direction, in particular a feed axis extending along, in particular in parallel to, the roller rotational axis. The translational displaceability along a radial feed axis serves in particular for shaping the glass intermediate in the radial direction. The translational displaceability of the shaping rollers in the axial direction serves in particular to axially feed the shaping rollers as a function of the axial position of the region of the glass intermediate to be deformed. The axial position and the length in the axial direction of the region to be deformed can vary in particular as a function of the thickness of the glass intermediate. In particular, in an upstream step, in particular when cutting the glass intermediate to size, its thickness can be ascertained and the length and/or axial position of the region to be deformed can be ascertained as a function of the thickness. The thickness, the length, and/or the axial position of the region to be deformed can subsequently be transmitted to the device so that the axial position of the shaping rollers can be adjusted accordingly. Glass products with high dimensional accuracy can thereby be produced in particular even with a variable thickness of the glass intermediate. This consideration of the variation in thickness of the glass intermediate may be referred to as glass mass compensation.

In one embodiment with two or more shaping rollers, in particular each of the shaping rollers can be translationally displaceable along a separate radial feed axis. Alternatively or additionally, each of the shaping rollers may be translationally displaceable along an axial feed axis. In embodiments in which each shaping roller is translationally displaceable in each case in the axial direction and in the radial direction, each of the shaping rollers is preferably translationally displaceable in the axial direction via one axial feed axis, while each of the shaping rollers is translationally displaceable in the radial direction via separate radial feed axes.

In a preferred embodiment, one or more of the radial feed axes extends as a connecting line between the longitudinal axis of the glass intermediate, in particular the receptacle rotational axis, and the roller rotational axis/axes.

According to the invention, the device comprises at least one linear motor for the translational positioning of the at least one shaping roller in such a way that the shaping roller directly follows a translational positioning movement of the translator of the linear motor.

The at least one linear motor can have at least one axial linear motor. The term "axial linear motor" refers to a linear motor whose translator is displaceable in the axial direction, in particular along or in parallel to the roller rotational axis. Alternatively or additionally, the at least one linear motor may have at least one radial linear motor. The term "radial linear motor" refers to a linear motor whose translator is displaceable in the radial direction, in particular transversely or orthogonally, to the roller rotational axis.

In the sense of the present invention, a linear motor comprises in particular a stator and a translator. The translator is the movable part of the motor. The stator is the immovable part of the motor. In particular, the translator can be put into a translational positioning movement by means of magnetic field forces acting between the translator and the stator, in particular Lorentz forces. In particular, the translator can be set in a purely translational positioning movement. In order to provide the magnetic field forces, the linear motor can have a primary part and a secondary part. The primary part is in particular an electromagnet. The secondary part is in particular a permanent magnet. The translator can be set in the translational positioning movement by the magnetic field forces acting between the primary part and the secondary part. The translator is formed either as a primary part, in particular an electromagnet, or as a secondary part, in particular a permanent magnet. In embodiments in which the translator is formed as a primary part, the stator is in particular formed as a secondary part. In embodiments in which the translator is formed as a secondary part, the stator is in particular formed as a primary part.

The fact that the shaping roller or other components described below, such as a roller motor, a radial bearing, a guide rail, a guide carriage, a roller carriage or a roller arm, a measuring unit or a measuring strip, directly follows the translational positioning movement of the translator in particular means that the relevant component substantially follows a translational positioning movement of the translator in terms of magnitude and direction. In this context, the term "substantially" in particular means that, aside from thermal, dynamic, or elastic deformation, the relevant component performs exactly the same translational positioning movement in terms of magnitude and direction as the translator.

In order for the shaping roller to directly follow a translational positioning movement of the translator, the translator can in particular be translationally displaceable in parallel to the feed axis of the shaping roller. In particular, the shaping roller is fixedly connected to the translator in such a way that the shaping roller directly follows the translational positioning movement of the translator. Such a fixed connection of the shaping roller or other components described below, such as a roller motor, a radial bearing, a guide rail, a guide carriage, a roller carriage or a roller arm, a measuring unit or a measuring strip, in particular means that the relevant component is connected to the translator without transmission ratio, in particular without gears. In particular, the translator and the component fixedly connected to the translator in this way are connected to one another immovably relative to one another along the feed axis. In particular, with such a fixed connection between the translator and the relevant component, there is no degree of freedom of movement along the feed axis.

The previously described fixed connection between the translator and a component such that the component directly follows a translational positioning movement of the translator is also referred to below as an immovably fixed connection. In this case, the immovably fixed connection always relates to a connection which ensures that the relevant component directly follows the translational movement of the translator. Accordingly, an immovably fixed connection of a shaping roller to a translator, which is translationally displaceable in the axial direction, requires that the shaping roller directly follows the translational positioning movement of the translator along this axial direction. However, such an immovably fixed connection does not rule out that the shaping roller is displaceable in the radial direction relative to the translator.

As can be seen from the preferred embodiment of the invention described below, the device can have a plurality of linear motors via which the shaping rollers can be displaced on the one hand in the radial direction and on the other hand in the axial direction.

In particular, in embodiments with two or more shaping rollers, the device can have, for each shaping roller, a separate linear motor whose translator is translationally displaceable in particular in the radial direction. In particular, each of the shaping rollers is fixedly connected to the translator of its own linear motor in such a way that the shaping roller directly follows a translational positioning movement of the translator in the radial direction. Alternatively or additionally, the device may have a linear motor whose translator is fixedly connected in the axial direction to each of the shaping rollers in such a way that each of the shaping rollers directly follows a translational positioning movement of the translator in the axial direction.

The device can additionally have a reshaping mandrel which can be displaced in parallel to the roller rotational axis. The reshaping mandrel can in particular be oriented coaxially to the longitudinal axis of the glass intermediate, in particular the receptacle rotational axis. In particular, the reshaping mandrel can be displaced translationally into the interior of a glass intermediate held in particular by the receptacle in order to shape the glass intermediate on the inside in shape-rolling contact, while the at least one shaping roller shapes the glass intermediate on the outside.

In one embodiment, the device comprises at least one roller motor for rotating the at least one shaping roller in shape-rolling contact. In particular, the roller motor is fixedly connected to the translator in such a way that the roller motor directly follows the translational positioning movement of the translator. In particular, the roller motor is formed as a rotating electric motor. In particular, the roller motor has a motor output shaft to which the at least one shaping roller is fastened. In particular, the shaping roller is fastened in a rotationally fixed manner to the output shaft of the roller motor. In particular, the shaping roller is driven directly by the roller motor. In particular, the shaping roller is mounted radially and axially via the radial bearing of the motor output shaft. The shaping roller can be fixedly connected to the translator via the roller motor. As a result, both the roller motor and the shaping roller directly follow a translational positioning movement of the translator.

The at least one linear motor can comprise a linear motor with a translator which can be displaced in the axial direction to the roller rotational axis and a linear motor with a translator which can be displaced translationally in the radial direction. In particular, each of the two translators is immovably fixedly connected to the roller motor so that the roller motor directly follows the positioning movement of the one translator in the radial direction and the positioning movement of the other translator in the axial direction.

Alternatively or additionally, the at least one shaping roller may have two or more shaping rollers, wherein each of the shaping rollers is rotatable via a respective roller motor. In particular, each of the roller motors can be displaceable transversely to the roller rotational axis via a separate linear motor. In particular, each of the roller motors is immovably fixedly connected to a respective translator of a linear motor so that each roller motor directly follows the translational positioning movement of a translator. In particular, the roller motors are displaceable in the radial direction relative to one another via the linear motors.

Alternatively or additionally, each of the roller motors may be displaceable in the axial direction via a common linear motor. For example, each roller motor may be fixedly connected to a single axially displaceable translator of a linear motor in such a way that both roller motors directly follow the translational positioning movement of the one translator in the axial direction.

In one embodiment, the device comprises at least one radial bearing, in particular a radial bearing of a roller motor. In particular, the radial bearing is fixedly connected to the translator in such a way that the radial bearing directly follows the translational positioning movement of the translator. In the embodiment described above, in which the shaping roller can be rotated via at least one roller motor in shape-rolling contact, the at least one radial bearing is may be formed by at least one radial bearing of the roller motor. In embodiments in which the at least one shaping roller is freely rotatably mounted, the at least one shaping roller can be fastened to the device without a roller motor. In such embodiments, the at least one shaping roller is mounted radially and in particular axially via radial bearings, such as single, double, or multiple groove ball bearings.

The embodiments described above and below, in which the at least one shaping roller is driven with roller motors, can also be formed analogously as embodiments in which the at least one shaping roller is mounted freely rotatably (without a roller motor) in that the at least one roller motor is replaced by at least one radial bearing. The at least one radial bearing supports the at least one shaping roller in particular in the radial direction and preferably in the axial direction.

In one embodiment, the device comprises at least one linear guide for guiding the translator and the at least one shaping roller along a feed axis, wherein the linear guide comprises a guide rail and a guide carriage, which are movable relative to one another along the feed axis, wherein the translator is fixedly connected to the guide rail or the guide carriage in such a way that the guide rail or the guide carriage directly follows a translational positioning movement of the translator.

In particular, the guide rail and the guide carriage are translationally displaceable relative to one another in parallel to the feed axis of the at least one shaping roller. In particular, the guide carriage encompasses the guide rail. In particular, the guide carriage and the guide rail are exclusively displaceable relative to one another in parallel to the feed axis. In particular, both the translator and the shaping roller are guided in parallel to the feed axis via the linear guide.

In embodiments with an axial linear motor, the at least one linear guide can have at least one axial guide. An axial guide is a linear guide in which the guide carriage and the guide rail are displaceable relative to one another in the axial direction, in particular along or in parallel to the roller rotational axis. In an axial guide, the guide carriage is preferably connected immovably fixedly in the axial direction to the translator.

In embodiments with a radial linear motor, the at least one linear guide can have at least one radial guide. A radial guide is a linear guide in which the guide carriage and the guide rail are displaceable relative to one another in the radial direction, in particular transversely or orthogonally to the roller rotational axis. In a radial guide, the guide rail is preferably fixedly connected to the translator.

In embodiments comprising two or more shaping rollers which can be displaced via a respective radial linear motor, each translator of the radial linear motors can be guided via a separate radial guide. In embodiments in which the at least one shaping roller is displaceable via an axial linear motor and a radial linear motor, the translator of the radial linear motor can be guided via a radial guide, and the translator of the axial linear motor can be guided via an axial guide.

In addition to the guide rail and the guide carriage, the at least one linear guide can have a guide cylinder and a guide piston, wherein the translator is connected fixedly to the guide cylinder or the guide piston in such a way that the guide cylinder or the guide piston directly follows the translational positioning movement of the translator. It has been shown that through the design with the additional guide cylinder and the additional guide piston, the guide rail and the guide carriage can be relieved so that the measuring system described below can be used more reliably on the guide rail and the guide carriage for measuring the translational positioning movement. Alternatively to relieving the guide rail and the guide carriage through the use of a guide cylinder and the guide piston, the at least one linear guide may also be designed with two guide rails and two guide carriages.

In one embodiment, the part of the at least one linear guide fixedly connected to the translator, in particular the guide carriage or the guide rail, is connected fixedly to a roller carrier which can be displaced along the feed axis, in particular a roller carriage displaceable along the roller rotational axis and/or a roller arm displaceable transversely to the roller rotational axis, in such a way that the roller carrier directly follows the translational positioning movement of the translator.

The term "roller carrier" refers in particular to a structure carrying the at least one shaping roller. In particular, the at least one shaping roller is fixedly connected to the roller carrier in such a way that the shaping roller directly follows a translational positioning movement of the roller carrier. Depending on the embodiment, the previously described roller motor and/or the previously described roller bearing can be fixedly connected to the roller carrier in such a way that the roller motor and/or the roller bearing directly follows a translational positioning movement of the roller carrier.

In embodiments in which the at least one linear guide has an axial guide, the guide carriage is preferably fixedly connected to the roller carrier. In embodiments with an axial guide, the roller carrier preferably has a roller carriage. The roller carriage can be translationally displaced in particular along an axial feed axis. The roller carriage is preferably guided along the axial feed axis via two axial guides, each comprising a guide carriage and a guide rail. The two guide carriages are preferably connected fixedly to the roller carriage in such a way that the roller carriage directly follows a translational positioning movement of the two guide carriages. The two guide carriages are preferably translationally displaceable in parallel to one another along the axial feed axis. The two guide rails are preferably connected fixedly, in particular immovably, to a foundation of the shaping device. The term "foundation" refers in particular to the part of the shaping device via which the shaping device can be placed on the floor of a production hall. In particular, the foundation is decoupled from the translational positioning movement of the at least one shaping roller.

The at least one linear motor preferably has an axial linear motor, which is arranged between the two axial guides. In particular, the translator of the axial linear motor is fixedly connected to the roller carriage. In particular, the stator of the linear motor is fixedly connected to the foundation. In particular, the stator of the axial linear motor and the two guide rails of the axial guides extend in parallel to one another. In particular, the translator of the axial linear motor and the guide carriage of the axial guides extend in parallel to one another. In particular, the translator of the axial linear motor is arranged between the guide carriages of the axial guides. In particular, the stator of the axial linear motor is arranged between the guide carriages of the axial guides.

In embodiments in which the at least one linear guide has a radial guide, the guide rail is preferably fixedly connected to the roller carrier. In embodiments with a radial guide, the roller carrier preferably has at least one roller arm. The roller arm can be translationally displaced in particular along a radial feed axis. The roller arm preferably extends in the axial direction. Preferably, the roller arm is fixedly connected to the translator of a radial linear motor. Preferably, the roller arm is fixedly connected to one of the at least one shaping roller. Particularly preferably, the roller arm is fixedly connected to a roller motor or a radial bearing, which roller motor/radial bearing rotatably supports the shaping roller. Preferably, the shaping roller and the translator of the radial linear motor are connected to the roller arm at an axial distance from one another. The part of the radial guide fixedly connected to the translator, in particular the guide rail, is particularly preferably fixedly connected to the roller arm. The part of the radial guide fixedly connected to the translator is preferably fastened in the axial direction between the shaping roller and the translator of the radial linear motor with the roller arm.

In embodiments in which the at least one shaping roller has two shaping rollers that can be translationally displaced in the radial direction, the device preferably has two roller arms and two radial linear motors. Each translator of the two radial linear motors is preferably fixedly connected to a respective roller arm in such a way that the roller arm directly follows the translational positioning movement of the translator. Alternatively or additionally, each of the two shaping rollers is fixedly connected to a respective roller arm of the two roller arms in such a way that the respective shaping roller directly follows the respective translational positioning movement of the roller arm. Each of the roller arms is preferably guided along a radial feed axis via a separate radial guide. The guide rail of the radial guide is in each case preferably fixedly connected to the roller arm. Preferably, the roller arms are translationally displaceable relative to one another in the radial direction. Particularly preferably, the roller arms are translationally displaceable along a common radial feed axis.

In embodiments in which the at least one shaping roller is translationally displaceable both in the radial direction and in the axial direction, the roller carrier preferably has a roller carriage and at least one roller arm, in particular two of the roller arms described above. The at least one roller arm is preferably fixedly connected to the roller carriage in the axial direction in such a way that the roller arm directly follows a translational positioning movement of the roller carriage in the axial direction. The at least one roller arm is preferably displaceable in the radial direction relative to the roller carriage. The at least one roller arm is preferably displaceable relative to the roller carriage in the radial direction via a respective radial guide. Preferably, the guide rail of the radial guide is fixedly connected to the roller arm in each case, and the guide carriage of the radial guide is fixedly connected to the roller carriage in each case. Alternatively or additionally, the translator of the at least one radial linear motor is fixedly connected to the respective roller arm, and the stator of the at least one radial linear motor is fixedly connected to the roller carriage. Alternatively or additionally, the translator of the axial linear motor is fixedly connected to the roller carriage, and/or the stator of the axial linear motor is fixedly connected to the foundation of the shaping device.

The primary part of the at least one linear motor is particularly preferably fixedly connected to the roller carriage. In embodiments with an axial linear motor and at least one radial linear motor, the translator of the axial linear motor is preferably formed as a primary part, and the stator of the radial linear motor is formed as a primary part. It has been found that by fastening the primary parts to the roller carriage, the dynamic loading of the electrical components of the primary parts can be reduced, which occur to a greater extent in the case of a positioning movement in the radial direction. Therefore, the secondary parts of the linear motors are preferably fastened to the roller arms.

In embodiments in which the at least one linear guide has a radial guide, the guide rail is preferably fixedly connected to the roller carrier.

In one embodiment, the device comprises at least one measuring system with an in particular optical measuring unit and a measuring strip for measuring the translational positioning movement of the translator, wherein the measuring unit or the measuring strip is fixedly connected to the translator in such a way that the measuring unit or the measuring strip directly follows the translational positioning movement of the translator.

This can in particular ensure that the relative movement between the measuring unit and the measuring strip corresponds to the translational positioning movement of the translator. As a result, conclusions about the translational positioning movement of the translator can in particular be drawn directly from the measured relative movement between the measuring unit and the measuring strip. A particularly precise feed of the shaping roller can thereby be ensured.

The measuring strip is preferably formed as a metal strip. Incremental or absolute markings, which can be read by the measuring unit, are preferably applied to the measuring strip.

In particular, the measuring system detects the markings on the measuring strips. The relative movement between the measuring system and the measuring strip can thereby be ascertained.

The at least one measuring system preferably comprises at least one measuring system per linear motor of the at least one linear motor. Preferably, the measuring unit or the measuring strip of each measuring system is in each case fixedly connected to the corresponding translator of the at least one linear motor in such a way that the measuring unit or the measuring strip directly follows the translational positioning movement of the translator.

In embodiments with an axial linear motor, the measuring unit of the at least one measuring system is preferably fixedly fastened to the roller carriage in such a way that the measuring unit directly follows a positioning movement of the translator of the axial linear motor. Each measuring unit of the at least one measuring system is preferably fixedly fastened to the roller carriage in this way.

In embodiments in which no axial linear motor is provided, the measuring unit of the at least one measuring system is preferably fixedly connected to the foundation of the shaping device.

In one embodiment, the measuring strip is formed on a guide rail of a linear guide, in particular the linear guide described above, for guiding the translator and the at least one shaping roller. The measuring strip is preferably in each case fastened to a guide rail, which is connected fixedly to the translator whose translational positioning movement is to be measured, in such a way that the guide rail directly follows the translational positioning movement of the translator.

In embodiments with at least one radial linear motor, the measuring strip is preferably fixedly fastened to the roller arm described above in such a way that the measuring strip directly follows the translational positioning movement of the roller arm. In embodiments with an axial linear motor, the measuring unit is preferably fixedly fastened to the roller carriage described above in such a way that the measuring unit directly follows a translational positioning movement of the roller carriage.

In one embodiment, the measuring unit is connected to an alignment rail, which extends through a guide gap between a guide carriage and a guide rail of a linear guide, in particular of the linear guide described above, for guiding the translator. The alignment rail can in particular ensure that the relative movement of the guide carriage or of the guide rail takes place along the alignment rail. In particular in the case of embodiments in which the measuring strip is fastened to the guide rail or the guide carriage, it can thereby be ensured that the relative movement between the guide carriage and the guide rail corresponds to the relative movement between the measuring unit and the measuring strip. The alignment rail preferably extends in a gap provided for this purpose between the guide rail and the guide carriage. In particular, the alignment rail is connected immovably fixedly to the measuring unit. In particular provided in the alignment rail is an opening, in particular a gap, via which an optical signal, such as a light beam, can be projected from the measuring unit onto the measuring strip and/or can be reflected from the measuring strip back to the measuring unit. In particular, the measuring unit of the at least one measuring system is fastened to the roller carriage.

In one embodiment, the translator of one of the at least one linear motor is translationally displaceable transversely, in particular orthogonally, to a roller rotational axis about which the at least one shaping roller is rotatable, in order to put in particular the at least one shaping roller into shape-rolling contact for shaping and to remove it therefrom after shaping has taken place.

A translator displaceable transversely to the roller rotational axis is preferably formed as a secondary part. Such a secondary part is preferably fastened to a roller arm immovably fixedly in the radial direction, while the associated primary part is fastened to a roller carriage.

The term "putting the shaping roller into shape-rolling contact" in particular means that the shaping roller is displaced transversely to the roller rotational axis at least to such an extent that it is in contact, in particular with its lateral surface, with the glass intermediate. Preferably, the shaping roller is displaceable transversely to the roller rotational axis beyond the first contact in order to deform the glass intermediate transversely to the roller rotational axis. Particularly preferably, the shaping roller in shape-rolling contact is further displaceable transversely to the roller rotational axis in order to allow a gradual, in particular stepwise or continuous, deformation of the glass intermediate.

Particularly through the use of a linear motor, the at least one shaping roller can be put into shape-rolling contact particularly quickly and in particular precisely. In particular, the direct coupling of the shaping roller and the translator, in particular in combination with the previously described measuring system and/or the previously described linear guide, allows the further feed for deformation of the glass intermediate to be carried out precisely.

The term "removing the shaping roller from shape-rolling contact" in particular means that the shaping roller is displaced transversely to the roller rotational axis to such an extent that it is no longer in contact, in particular with its lateral surface, with the glass intermediate.

In one embodiment, the translator of one of the at least one linear motor is translationally displaceable, in particular translationally displaceable for glass mass compensation, along, in particular in parallel to, a roller rotational axis about which the at least one shaping roller is rotatable.

A translator displaceable along the roller rotational axis is preferably formed as a primary part. Such a primary part is preferably connected immovably fixedly to a roller carriage, while the associated secondary part is connected to a foundation of the shaping device.

Due to the translational displaceability along the roller rotational axis, material displaced in particular during the shaping of the glass intermediate can be distributed along the roller rotational axis. For this purpose, the translator is in particular connected fixedly to the shaping roller in such a way that the shaping roller in shape-rolling contact directly follows a translational positioning movement of the translator.

In one embodiment, the at least one shaping roller comprises two shaping rollers, and the at least one linear motor comprises two linear motors, comprising a respective translator, wherein one of the two translators is in each case fixedly connected to a respective one of the two shaping rollers in such a way that one of the two shaping rollers in each case directly follows a translational positioning movement of the respective translator. In particular, the two linear motors are designed as radial linear motors.

In one embodiment, the two translators are each connected to a respective shaping roller independently of one another in such a way that the two shaping rollers are translationally displaceable independently of one another.

In particular, the two shaping rollers can be displaced relative to one another in the radial direction. In particular, the immovably fixed connection of a respective translator to a respective shaping roller is realized via a respective roller arm and/or via a respective linear guide. Each of the roller arms is preferably guided along a radial feed axis via a separate linear guide, in particular radial guide. Preferably, a respective translator, a respective shaping roller, and a respective guide rail or a respective guide carriage are immovably fixedly connected to the roller arm, while the correspondingly remaining part of the linear guide and the stator are immovably fixedly connected to a roller carriage.

In particular, a measuring system as described above is integrated into at least two, preferably into each, of the linear guides.

In particular, the two shaping rollers can be displaced relative to one another in the radial direction via a common radial feed axis.

In particular, the two shaping rollers are in each case immovably fixedly connected to the respective roller arm via a roller motor or a radial bearing.

In particular, the at least one measuring system has a respective measuring system for each of the two shaping rollers. In particular, the measuring strip of a measuring system is in each case immovably fixedly fastened to the rail of a corresponding guide system and/or to a corresponding roller arm.

In one embodiment, the at least one linear motor comprises at least one linear motor with a translator that can be translationally displaced transversely, in particular orthogonally, to the roller rotational axis, and a linear motor with a translator that can be displaced along, in particular in parallel to, the roller rotational axis.

The at least one linear motor with a translator that can be displaced transversely to the roller rotational axis can also be referred to as a radial linear motor. The at least one radial linear motor preferably comprises two of the radial linear motors described above.

The linear motor with a translator that can be displaced along the roller rotational axis can also be referred to as an axial linear motor. The translator of the axial linear motor is preferably connected fixedly to the at least one shaping roller in such a way that the at least one shaping roller directly follows a positioning movement of the translator in the axial direction. For this purpose, the translator of the axial linear motor is preferably connected immovably fixedly in the axial direction to a roller carriage which, in turn, is connected immovably fixedly in the axial direction to the at least one shaping roller. The roller carriage is preferably connected immovably fixedly in the axial direction to the at least one shaping roller via a roller arm that can be displaced translationally in the radial direction, in particular via a respective roller arm per shaping roller. In particular, the roller carriage is guided along an axial feed axis via an axial guide, in particular via two axial guides. In particular, the guide carriage of the axial guide, in particular the two guide carriages of the two axial guides, is connected immovably fixedly to the roller carriage, while the guide rails of the axial guide, in particular the two guide rails of the two axial guides, are connected immovably fixedly to the foundation of the shaping device. In particular, a respective measuring system as described above is integrated in each of the axial guides.

In one embodiment, the invention relates to a system for producing an in particular rotationally symmetrical glass product, such as a glass syringe, a glass carpule, a glass vial, or a glass ampoule. In particular, the system can be suitable for producing a glass product of borosilicate glass. The system can be a glass production system, in particular a borosilicate glass production system. The system can be suitable for producing a pharmaceutical glass product. Pharmaceutical glass products are characterized in particular in that they have a dimensional accuracy of the final contour of 0.03 millimeters.

The system comprises a receptacle for rotatably holding a glass intermediate, in particular a glass tube, and the device described above, in particular a shaping device, for reshaping the glass intermediate.

The receptacle can be rotated in particular about a receptacle rotational axis. In particular, the system has a receptacle motor, via which the receptacle can be rotated about a receptacle rotational axis. The receptacle can in particular be formed as a chuck. In particular, the receptacle is suitable for detachably axially and/or radially fixing a glass intermediate. In particular, the receptacle rotational axis extends substantially in a horizontal plane. In this context, "substantially" means, in particular, that the receptacle rotational axis is inclined relative to the horizontal plane by a maximum of 1°, 5°, 10°, or 20°. The receptacles for the rotatable holding of a glass intermediate differ in particular from customary receptacles, such as receptacles for the rotatable holding of metal pieces to be machined, in that they can receive and release fragile glass intermediates without damaging them, for example by scratches in the glass or by breaking the glass.

In one embodiment, the system comprises a carousel for moving the receptacle to different manufacturing stations or for moving the at least one shaping roller to different receptacles for glass intermediates. The carousel is preferably formed to move the receptacle to different manufacturing stations. The carousel preferably comprises a plurality of the receptacles described above for holding a plurality of glass intermediates. The carousel preferably comprises at least 2, 4, or 6, in particular at least 8 or 10, receptacles. In particular, the carousel is rotatable about a carousel axis. In particular, the plurality of receptacles are distributed in the circumferential direction on the carousel. The carousel axis preferably extends substantially in the gravitational direction. In this context, "substantially" in particular means that the carousel axis is inclined relative to the gravitational direction by a maximum of 1°, 5°, 10°, or 20°.

Preferably, a glass intermediate is fastened to the at least one receptacle in order to produce a glass product. In order to produce the glass product, the glass intermediate can preferably be moved into the working area of the various manufacturing stations by rotating the carousel about the carousel axis. For this purpose, the at least one receptacle and the at least one manufacturing station, in particular the shaping device, are positioned relative to one another in such a way that the glass intermediate can be moved into the working area of the at least one manufacturing station by rotating the carousel about the carousel axis. The receptacle can be moved successively into the working area of various manufacturing stations in particular in the circumferential manufacturing direction.

The at least one shaping roller described above and the at least one linear motor are in particular embodied at a manufacturing station in the form of a shaping device. Several, in particular at least two, three, or four, shaping devices are preferably distributed around the carousel axis in the circumferential manufacturing direction. In particular, each of the shaping devices has at least one shaping roller as described above and at least one linear motor as described above. The shaping devices are preferably arranged one behind the other in the circumferential manufacturing direction in order to reshape the glass intermediate into the glass product in a plurality of steps. Preferably, at least one, in particular at least two, three, or four, burners for heating the glass intermediate are arranged upstream of the at least one shaping device in the circumferential manufacturing direction. In particular, at least one, in particular at least two, burners are provided between each of the at least one shaping device in order to reheat the glass intermediate between the individual reshaping steps.

An inspection station is preferably provided upstream of the first shaping device and the first burners in order to measure the position and the axial runout of the glass intermediate in the receptacle. For this purpose, the inspection station preferably has a camera.

Preferably effected downstream of the last shaping device is a cooling device for cooling the glass product after shaping has taken place.

An inspection station for inspecting the geometry of the glass product and/or an inspection station for detecting scratches and/or cracks in the glass product is preferably provided downstream of the last shaping device, in particular downstream of the last shaping device and the cooling device. A transfer device for transferring the glass product for further processing is preferably provided downstream of the last shaping device, in particular downstream of the last shaping device, the cooling device, and the at least one inspection station. The transfer device can in particular have means for collecting glass products ejected from the receptacle and/or for transporting the glass products to further processing stations, such as flange shaping stations.

The invention furthermore relates to a glass product, such as a glass syringe, a glass carpule, a glass vial, or a glass ampoule, which is produced with the device or system described above. In particular, the glass product is a borosilicate glass product. In particular, the glass product is a pharmaceutical glass product. In particular, the glass product is a pharmaceutical borosilicate glass product.

It has been found that the cycle times for reshaping glass intermediates, in particular the production of glass products, can be significantly reduced by the use of linear motors. In particular, due to the high dynamics of the linear motors, the cycle times could be halved in comparison to known linear drives, for example with rotating motor and worm gear. In particular, the required times for the feed of the shaping rollers could be halved. By the above-described combination of at least one linear motor with a linear guide and a measuring system, in particular by integrating the measuring system into the linear guides, a surprisingly high dimensional accuracy could be achieved. In particular, glass products with a dimensional accuracy of 0.03 mm of the final contour could be produced. In particular, the fixed connection of measuring strip or measuring unit to the translator and the shaping roller made it possible to achieve repetition accuracies of a few micrometers. The combination of radial linear motors for feeding the shaping rollers in the radial direction in order to reshape the glass intermediate in the radial direction and of axial linear motors for feeding the shaping rollers in the axial direction for glass mass compensation has proven to be particularly advantageous.

At the same time, the required transmission gear for providing a translational positioning movement could be saved by the use of linear motors in comparison to the use of rotating motors. This made it possible to reduce the complexity of the device. In particular, this made it possible to further increase the achievable dimensional accuracy of the final contour of the glass products.

BRIEF DESCRIPTION OF THE DRAWINGS

Other properties, features, and advantages of the invention become apparent below from the description of preferred embodiments of the invention with reference to the accompanying exemplary drawings, which show.

DETAILED DESCRIPTION OF THE INVENTION

Figure 8:
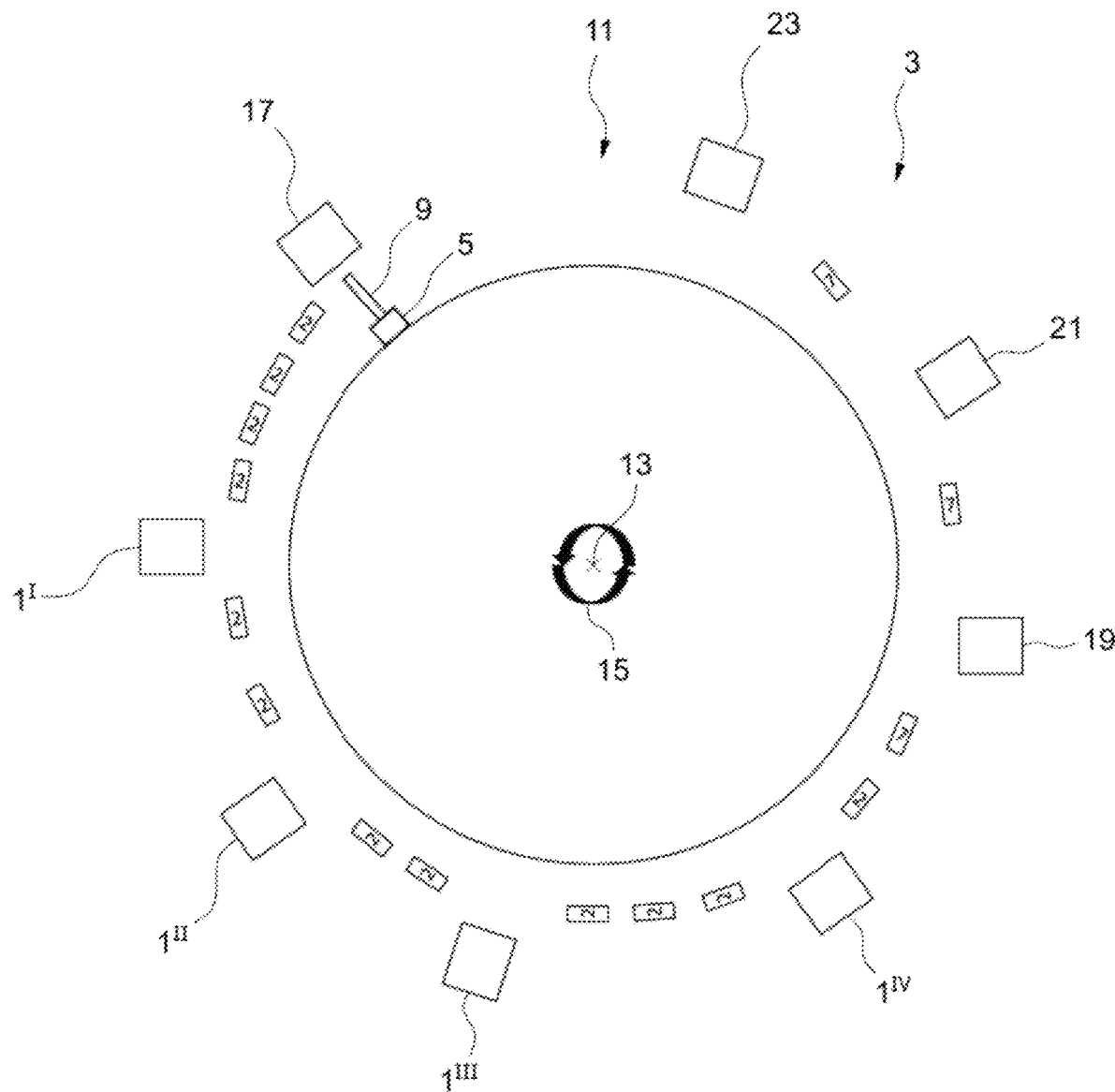
FIG. 8 a schematic view of a system for producing glass products.

FIG. 8 shows a schematic view of a system 3 for producing a glass product, in which four shaping devices $1^I$, $1^{II}$, $1^{III}$, $1^{IV}$ are depicted schematically. FIG. 8 schematically shows a receptacle 5 for rotatably holding a glass intermediate 9. The system 3 comprises a carousel 11 to which the receptacle 5 is attached. The carousel 11 is rotatable about the carousel axis 13, whereby the receptacle 9 together with the glass intermediate 9 can be fed to the four illustrated shaping devices $1^I$, $1^{II}$, $1^{III}$, $1^{IV}$ In this case, the glass intermediate is fed sequentially to the individual shaping devices $1^I$, $1^{II}$, $1^{III}$, $1^{IV}$ in the circumferential manufacturing direction 15. Burners 2 for heating the glass intermediate 9 are arranged in each case upstream of the first shaping device $1^I$ and between the subsequent shaping devices $1^{II}$, $1^{III}$ and downstream of the last shaping device $1^{IV}$.

A first inspection station 17 is provided in the circumferential manufacturing direction 15 upstream of the first shaping device $1^I$ in order to measure the position and the axial runout of the glass intermediate 9 in the receptacle 5.

In the circumferential manufacturing direction 15 downstream of the last shaping device $1^{IV}$ and of the last burner 2, a first cooling device 7 for cooling the glass body after shaping has taken place is to be effected.

A second inspection station 19 for inspecting the geometry of the glass product is provided in the circumferential manufacturing direction 15 downstream of the last shaping device $1^{IV}$ and the first cooling device 2. A second cooling device 7 and a third inspection station 21, downstream thereof, for detecting scratches and/or cracks in the glass product are provided downstream of the second inspection station 19 in the circumferential manufacturing direction 15. A third cooling device 7 is provided downstream of the third inspection station 21 in the circumferential manufacturing direction 15. A transfer device 23 for transferring the glass product for further processing is provided in the circumferential manufacturing direction 15 downstream of the third cooling device 7. The transfer device can in particular have means for collecting glass products ejected from the receptacle 5 and/or for transporting the glass products to further processing stations (not shown), such as flange shaping stations.

Figure 7:
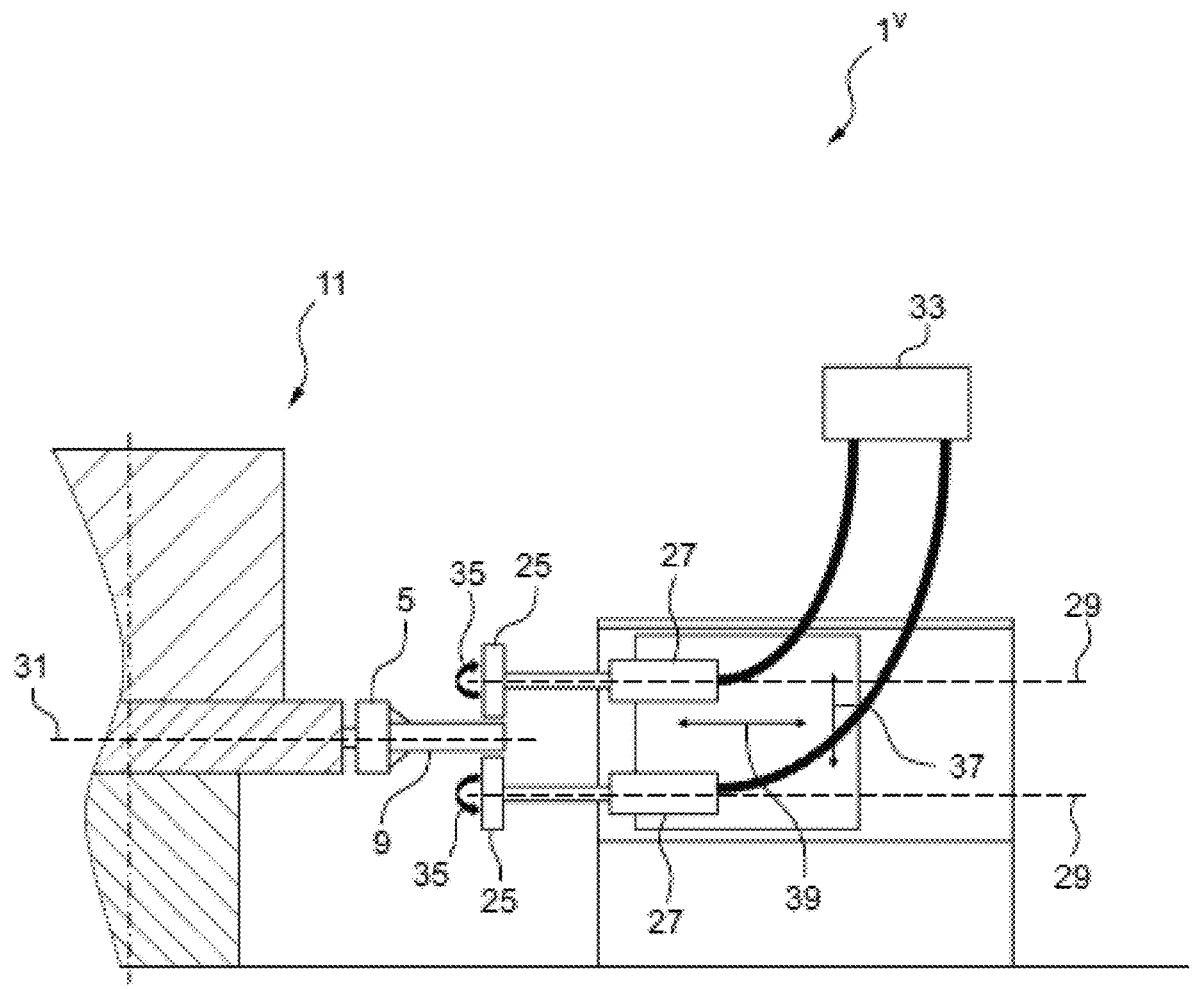
FIG. 7 a schematic partial view of a system for producing glass products according to FIG. 8.

FIG. 7 shows a schematic partial view of a system according to FIG. 8, which illustrates a section of the carousel 11 with a receptacle 5 holding a glass intermediate 9 and one of the shaping devices $1^I$, $1^{II}$, $1^{III}$, $1^{IV}$ illustrated schematically as shaping device $1^V$.

The receptacle 5 and the glass intermediate 9 can be rotated about a receptacle rotational axis 31 via a receptacle motor not shown.

The shaping device $1^V$ comprises two shaping rollers 25, which can in each case be rotated about a respective roller rotational axis 29 via a roller motor 27. The roller motors 27 are controlled via a common controller 33 in order to control the rotational speed of the shaping rollers 25 in the circumferential direction 35 about the roller rotational axis 29. The translational displaceability of the shaping rollers described in detail below is illustrated by the two arrows. The vertically oriented arrow represents the translational displaceability of the shaping rollers 25 transversely to the roller rotational axes 29 and to the receptacle rotational axis 31, in particular in the radial direction 37. The horizontally oriented arrow 39 represents the translational displaceability of the shaping rollers 25 along the roller rotational axes 29 and the receptacle rotational axis 31, in particular in the axial direction 39.

The illustrated position of the shaping rollers 25 relative to the glass intermediate 9 represents a position of the shaping rollers 25 just before shape-rolling contact with the glass intermediate 9. In order to move the shaping rollers 25 into shape-rolling contact with the glass intermediate 9, the shaping rollers 25 must still be displaced in the radial direction 39 at least to such an extent that the gap existing between the shaping rollers 25 and the glass intermediate 9 is bridged.

The translational displaceability of the shaping rollers 25 in the radial direction 37 serves in particular for shaping the glass intermediate 9 in the radial direction 37. The translational displaceability of the shaping rollers 25 in the axial direction 39 serves in particular to axially feed the shaping rollers as a function of the axial position of the region of the glass intermediate to be deformed. The axial position and the length in the axial direction of the region to be deformed can vary in particular as a function of the thickness of the glass intermediate. In particular, in an upstream step, in particular when cutting the glass intermediate to size, its thickness can be ascertained and the length and/or axial position of the region to be deformed can be ascertained as a function of the thickness. The thickness, the length, and/or the axial position of the region to be deformed can subsequently be transmitted to the device so that the axial position of the shaping rollers can be adjusted accordingly. Glass products with high dimensional accuracy can thereby be produced in particular even with a variable thickness of the glass intermediate. This consideration of the variation in thickness of the glass intermediate may be referred to as glass mass compensation.

FIGS. 1 to 6 show various views and illustrations of a shaping device 1, such as can be used in a system 3, as schematically illustrated in FIGS. 7 and 8, for one or more of the shaping devices $1^I$, $1^{II}$, $1^{III}$, $1^{IV}$, $1^{IV}$.

The shaping device 1 has two shaping rollers 25 which are translationally displaceable into a shape-rolling contact with the glass intermediate (not shown in FIGS. 1 to 6) for shaping. Furthermore, a reshaping mandrel 99 translationally displaceable in the axial direction 39 is illustrated. The reshaping mandrel 99 is oriented coaxially to the roller rotational axes 29 and in particular to the receptacle rotational axis 31. The reshaping mandrel 99 is translationally displaceable into the interior of a glass intermediate 9 held in particular by the receptacle 5 in order to shape the glass intermediate 9 on the inside in shape-rolling contact, while the shaping rollers 25 shape the glass intermediate 9 on the outside.

Furthermore, the shaping device 1 has three linear motors 41, 43 for the translational positioning of the three shaping rollers 25. The linear motors 41, 43 each have a translator 45, 47 and a stator 49, 51. The translators 45, 47 are each fixedly connected to at least one of the shaping rollers 25 in each case in such a way that the respective shaping roller 25 directly follows a translational positioning movement of the translator 45, 47.

Of the three linear motors 41, 43, two linear motors 41 are designed as radial linear motors 41 and one linear motor 43 is designed as an axial linear motor 43. The radial linear motors 41 can be seen particularly well in FIG. 1, FIG. 3, and FIG. 4. The axial linear motor can be seen in FIG. 5.

In the axial linear motor 43, the translator 47 is translationally displaceable in the axial direction 39 and the stator 51 is not displaceable in the axial direction 39. In the axial linear motor 43, the translator 47 is formed by the primary part (electromagnet) and the stator 51 is formed by the secondary part (permanent magnet).

In the radial linear motors 41, the translator 45 is translationally displaceable in the radial direction 37 and the stator 49 is not displaceable in the radial direction 37. However, both the translator 45 and the stator 49 of the two radial linear motors 41 are displaceable in the axial direction via the axial linear motor 43. In the radial linear motors 41, the translator 45 is formed by the secondary part (permanent magnet) and the stator 49 is formed by the primary part (electromagnet).

The shaping device 1 comprises a roller carriage 53 which can be displaced translationally in the axial direction 39. As can be seen in particular in FIG. 5, the translator 47 of the axial linear motor is fixedly connected to the roller carriage 53 in such a way that the roller carriage 53 directly follows a translational positioning movement of the translator 47 in the axial direction 39. In this embodiment, the immovably fixed connection is realized by a screw connection 57 of the translator 47 to the roller carriage 53. The stator 51 of the axial linear motor 43 is fixedly fastened to a foundation 55 of the shaping device 1. As described in detail below, each of the shaping rollers 25 is immovably fixedly fastened in the axial direction 39 via the respective radial linear motor 41 to the roller carriage 53 so that the shaping rollers 25 directly follow a translational positioning movement of the translator 47 in the axial direction 39.

Figure 1:
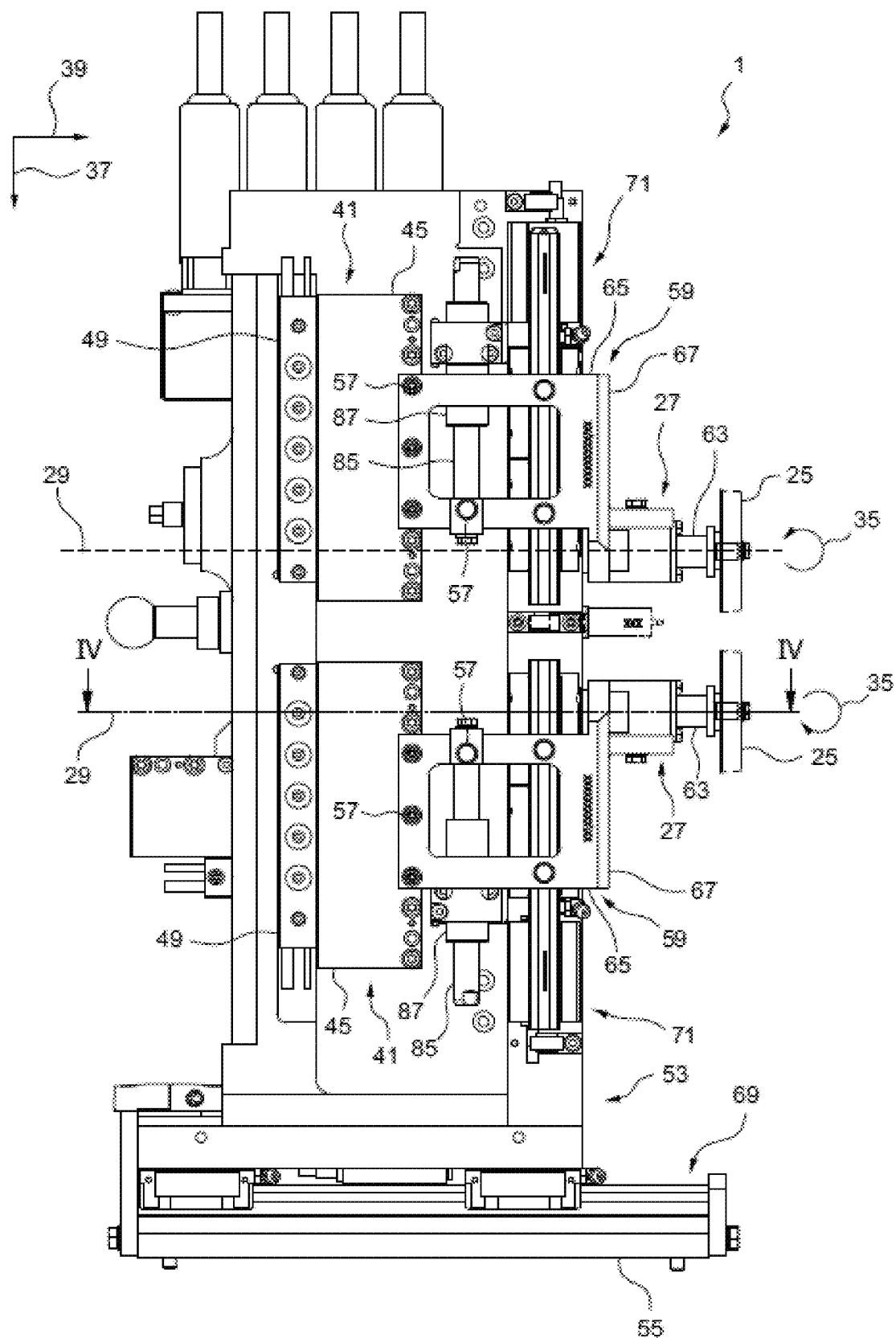
FIG. 1 a side view of a device according to the invention (shaping device)
Figure 2:
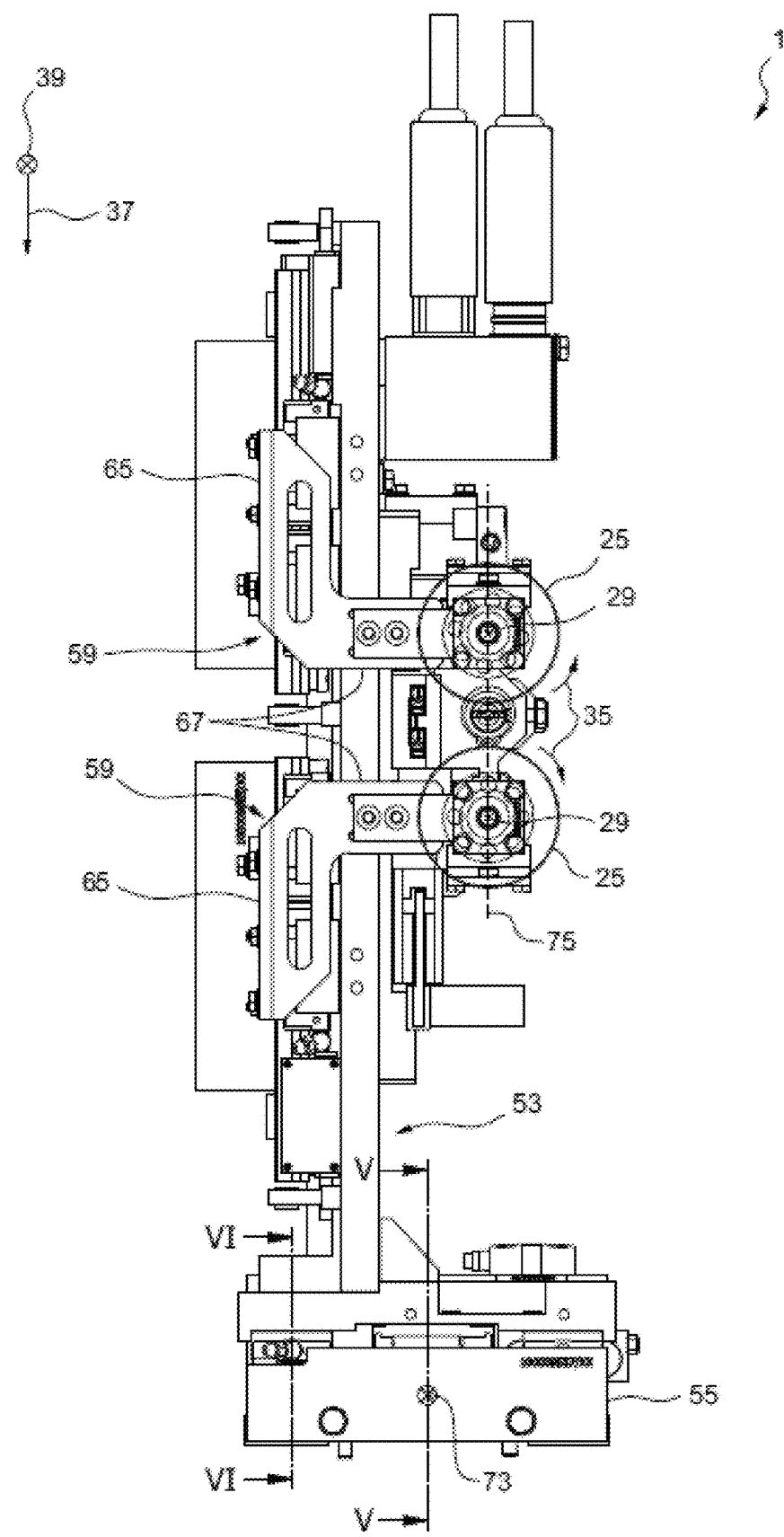
FIG. 2 a front view of the shaping device according to FIG. 1.
Figure 4:
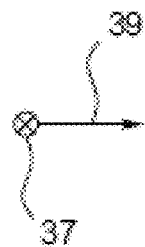
FIG. 4 a sectional view according to section line IV-IV in FIG. 1.
Figure 4:
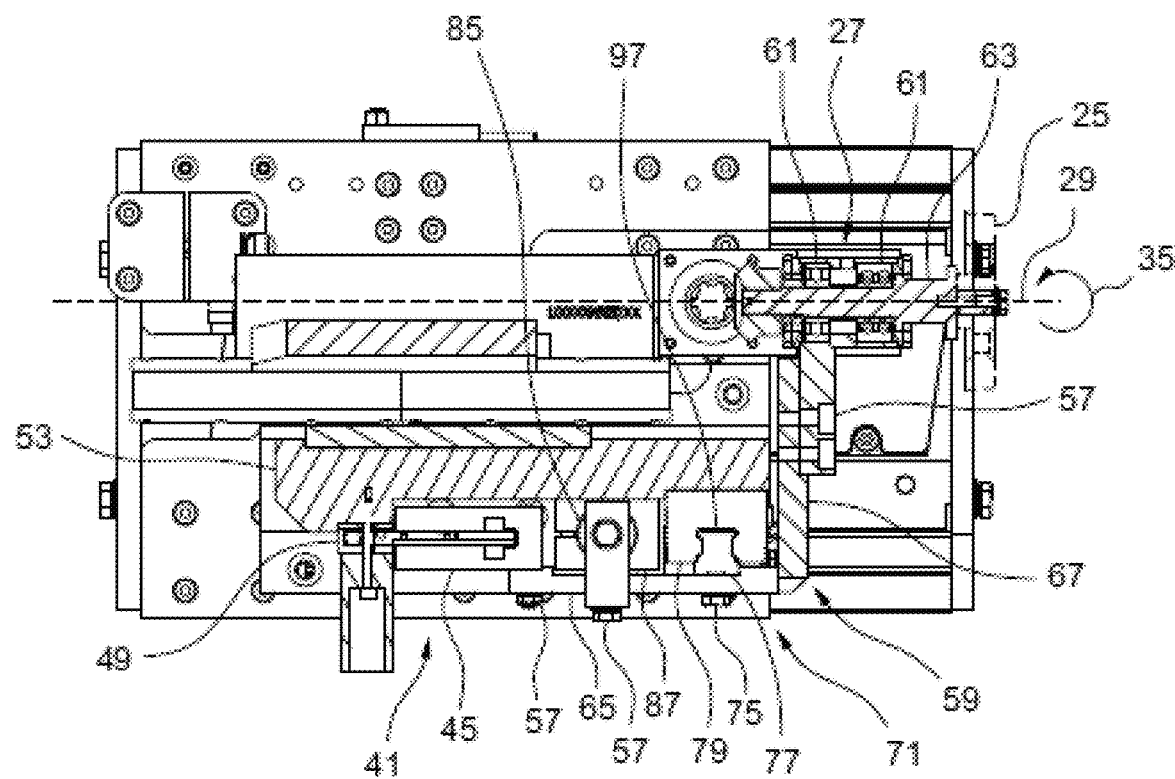

As can be learned in particular from FIGS. 1, 2, and 4, the shaping device comprises two roller arms 59, wherein one of the two shaping rollers 25 is in each case connected fixedly to the translator 45 of the radial linear motor 41 via a respective roller arm 59 in such a way that each of the shaping rollers 25 directly follows a translational positioning movement of a respective translator 45 in the radial direction 37. The immovably fixed connection between the roller arms 59 and the translators 45 is realized via screw connections 57 in the example shown.

The immovably fixed connection of the roller arms 59 to the respective shaping roller 25 is in each case realized, as can be learned in particular from FIG. 4, via a screw connection of the roller arms 59 to a respective roller motor 27, which at the same time forms the radial bearing 27 of the respective shaping roller 25. The roller motor 27 or the radial bearing 27 is thereby fixedly connected to the respective translator 45 via the roller arm 59 in such a way that the roller motor 27 or the radial bearing 27 directly follows a translational positioning movement of the translator 45 in the radial direction 37. The radial bearings 27 support the shaping rollers in the radial direction 37 and in the axial direction 39 in each case. For this purpose, the radial bearings 27 have two ball bearings 61, which support a motor output shaft 63 receiving the respective shaping roller 25.

The roller arms 59 have an axial arm section 65 extending in the axial direction 39 and a radial arm section 67 extending radially from the axial arm section 65 to the respective shaping roller 25. The axial arm section 65 serves to connect the translator 45 to the radial guide 71 described below and to the measuring system 89 described below. The radial arm section 67 serves to fasten the roller motor 27 or the radial bearing 27 to the axial arm section 65.

The shaping device 1 comprises four linear guides 69, 71 for guiding the translators 45, 47 along feed axes 73, 75, namely two axial guides 69 for guiding the translator 47 of the axial linear motor 43 along an axial feed axis 73 extending in the axial direction 39 and two radial guides 71 for guiding the translators 45 of the radial linear motors 41 along a radial feed axis 75 extending in the radial direction 37. As can be learned in particular from FIG. 2 and FIG. 5, the term "guiding along the feed axis 73, 75" means in particular guiding the respective translator 45, 47 in parallel to the feed axis 73, 75. In this case, the translator can be translationally movable in particular at an offset from the respective feed axis 73, 75. The linear guides 69, 71 each have a guide rail 77 and a guide carriage 79, which are movable relative to one another along the feed axis 73, 75. The translators 45, 47 are in each case fixedly connected to the guide rail 77 or the guide carriage 79 of a linear guide 69, 71 in such a way that the guide rail 77 or the guide carriage 79 directly follows the translational positioning movement of the respective translator 45, 47.

Figure 3:
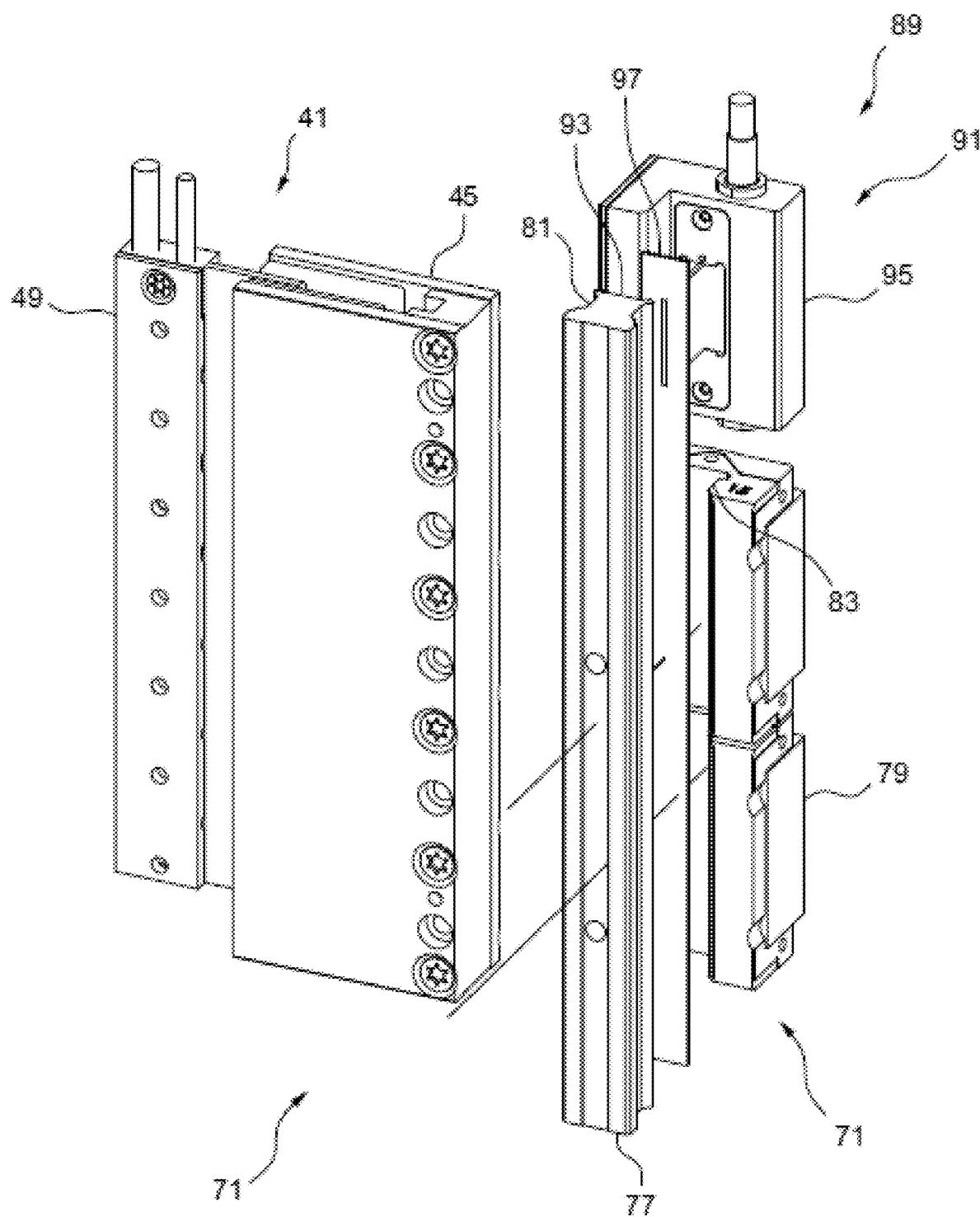
FIG. 3 an exploded view of a linear motor, a linear guide, and a measuring system of the shaping device according to FIG. 1.

A radial guide 71 is shown by way of example in an exploded view in FIG. 3 and in sectional view in FIG. 4. The guide carriage 79 encompasses the guide rail 77 in such a way that the guide rail 77 is guided translationally in the radial direction 37 in the guide carriage 79. The guide rail 77 is fixedly connected to the roller arm 59 by means of a screw connection 75 in such a way that the guide rail 77 directly follows a translational positioning movement of the roller arm 59 in the radial direction 37. As a result, the translator 45 of the radial linear motor 41 and the shaping rollers 25 are immovably fixedly connected in the radial direction 37 via the roller arm 59 to the guide rail 77. As can be learned in particular from FIG. 4, the guide carriage 79 of the radial guide 71 is immovably fixedly connected to the roller carriage 53 in the axial direction 39 so that the guide carriage 79 directly follows a translational positioning movement of the roller carriage 53 in the axial direction 39. As can also be learned from FIG. 4, the guide rail 77 of the radial guide 71 is immovably fixedly connected in the axial direction to the guide carriage 79 so that the guide rail 77 likewise directly follows a translational positioning movement of the roller carriage 53 in the axial direction 39. As can be learned in particular from FIG. 3, for this purpose, the guide rail 77 has grooves 81, which extend in the radial direction 37 and into which projections 83 of the guide carriage 79 extending in the radial direction engage. Since the guide rail 77 of the radial guide 71 is fixedly connected to the roller arm 59, the translator 45 of the radial linear motor 41 fixedly connected to the roller arm and the shaping roller 25 fixedly connected to the roller arm also directly follow a translational positioning movement of the roller carriage 53 in the axial direction 39.

As can be learned in particular from FIG. 1 and FIG. 4, in the illustrated embodiment, each of the radial guides 71 has, in addition to the guide rail 77 and the guide carriage 79, a guide piston 85 and a guide cylinder 87, which translationally guides the guide piston 85 in the radial direction 37. The guide piston 85 is immovably fixedly connected in the radial direction 37 to the roller arm 59 via a screw connection 57. The guide cylinder 87 is immovably fixedly connected to the roller carriage 53 in the radial direction 37 and in the axial direction 39. It has been shown that by additionally providing a guide piston 85 and a guide cylinder 87, the guide rail 77 and the guide carriage 79 of the radial guide 71 can be relieved so that the measuring system 89 described below can be used more reliably for measuring the translational positioning movement on the guide rail 77 and the guide carriage 79.

Figure 5:
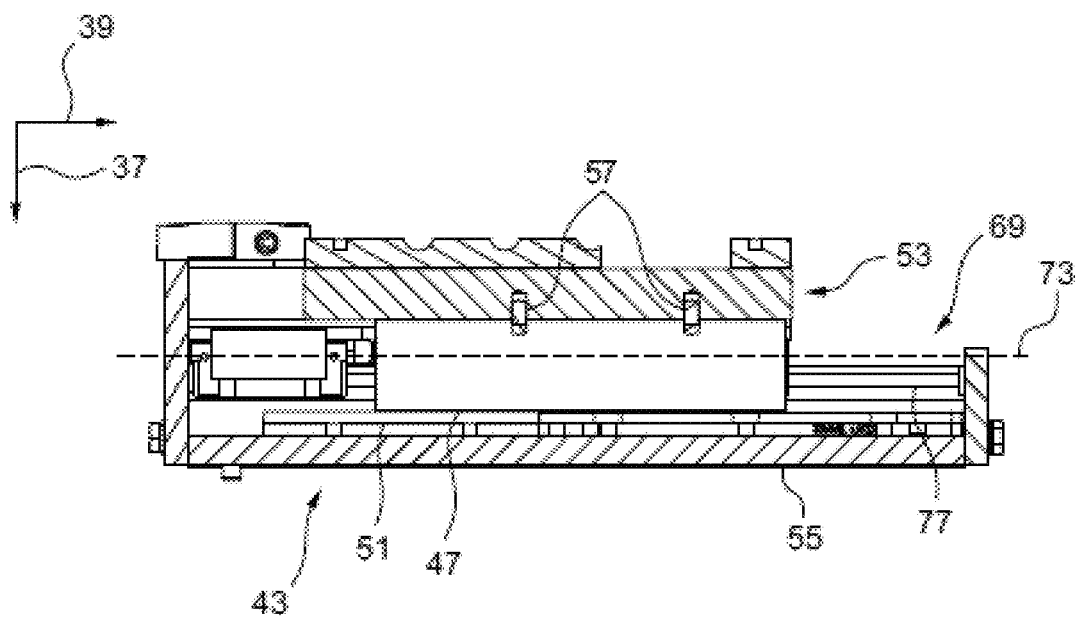
FIG. 5 a sectional view according to section line V-V in FIG. 2.
Figure 6:
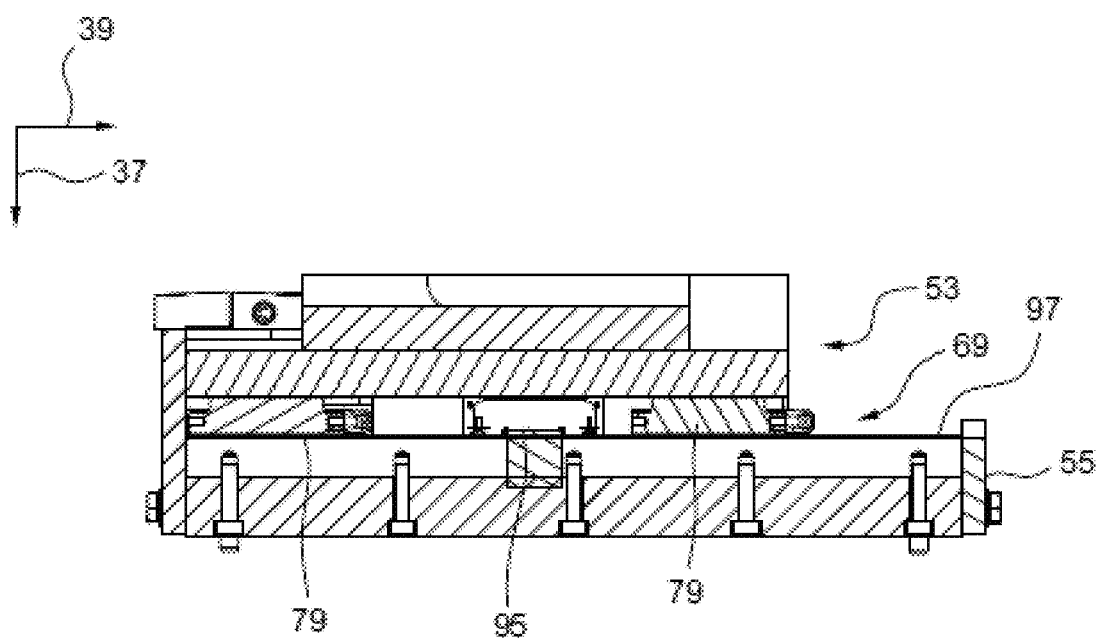
FIG. 6 a sectional view according to section line VI-VI in FIG. 2.

As can be learned in particular from FIG. 5 and FIG. 6, the two axial guides 69 have a guide rail 77 each and two guide carriages 79 each, which are translationally displaceable relative to one another in the axial direction 39. The guide rail 77 and the guide carriages 79 of the axial guides 69 can be formed like the guide rail 77 and the guide carriage 79 of the radial guide 71 illustrated in FIG. 3. As can be learned in particular from FIG. 6, the guide carriages 79 of the axial guides 69 are fixedly connected to the roller carriage 53 in such a way that the guide carriages 79 directly follow a translational positioning movement of the roller carriage 53 in the axial direction 39. As can be learned in particular from FIG. 5, the guide rails 77 of the axial guides 69 are fixedly fastened to the foundation 55 of the shaping device 1. The two axial guides 69 extend in parallel to one another in the axial direction 39 and are spaced apart from one another transversely to the axial direction 39. Arranged between the axial guide 69 is the axial linear motor 43, the translator 47 of which extends in parallel to the axial guide 69 in the axial direction 39. The translator 47 of the axial linear motor 43 as well as the guide carriages 79 of the axial guides 69 are fixedly connected to the roller carriage 53 so that the roller carriage 53 is guided in the axial direction 39 and directly follows the translational positioning movement of the translator 47 of the axial linear motor 43. Via the immovably fixed connection, described above, of the shaping rollers 25 to the roller carriage 53, the shaping rollers 25 directly follow the translational movement of the roller carriage 53 and thereby directly follow the translational positioning movement of the translator 47 of the axial linear motor 43.

The shaping device 1 has four measuring systems 89, each comprising an optical measuring unit 91 and a measuring strip 93 for measuring the translational positioning movement of the translators 45, 47.

Of two of the four measuring systems 89, one measuring system 89 is in each case integrated into the radial guide 71 described above. The measuring system 89 can be seen in particular in the exploded view in FIG. 3. In these measuring systems 89, the measuring strip 93 is in each case fixedly connected to the translator 45 in such a way that the measuring strip 93 directly follows the translational positioning movement of the translator 45 of the respective radial linear motor 41. In this case, the measuring strip 93 is formed on the respective guide rail 77 of the radial guide 71. The measuring strip 93 is formed on a side of the guide rail 77 facing the measuring unit 91. The measuring unit 91 is fixedly connected via a measuring system carriage 95 to the roller carriage 53 in the radial direction 37 and in the axial direction 39. The measuring unit 91 has an alignment rail 97, which extends through a guide gap between the guide carriage 79 and the guide rail 77 of the radial guide 71. This makes it possible, in particular, to ensure that the relative movement between the guide carriage 79 and the guide rail 77 corresponds to the relative movement between the measuring unit 91 and the measuring strip 93. A particularly precise measurement of the relative movement between the guide carriage 79 and the guide rail 77 can thereby be ensured. This ensures, in particular due to the immovably fixed connection in the radial direction 37 of the guide rail 81 to the translator 45 and to the shaping roller 25 via the roller arm 59, that the movement of the translator 45 and of the shaping roller 25 corresponds to the relative movement, measured by the measuring system, between the measuring unit 91 and the measuring strip 93, aside from deformations caused thermally and dynamically. A particularly precise feed of the shaping rollers 25 via the linear motor 41 can thereby be ensured.

The remaining two of the four measuring systems 89 are in each case integrated into the axial guide 69 described above. As can be seen in particular in FIG. 6, the measuring unit 91 is fixedly fastened to the roller carriage 53 via a measuring system carriage 95 in such a way that the measuring unit 91 directly follows the translational positioning movement of the translator 47 of the axial linear motor 43. The measuring strips 93 are fixedly connected to the guide rails 77 of the axial guides 69 fixedly connected to the foundation 55. Aside from the fact that in the measuring systems 89, for the axial guide 69, not the measuring strip 93 but rather the measuring unit 91 directly follows the translational positioning movement of the translator 47, the measuring systems 89 of the axial guide 69 are formed in particular like the measuring systems 89 of the radial guide 71 described above.

The features disclosed in the above description, the figures, and the claims may be important both individually and in any combination for realizing the invention in the various embodiments.

LIST OF REFERENCE SYMBOLS

1 Shaping device ($1^I$, $1^{II}$, $1^{III}$, $1^{IV}$, $1^V$)
2 Burner
3 System
5 Receptacle
7 Cooling device
9 Glass intermediate
11 Carousel
13 Carousel axis
15 Circumferential manufacturing direction
17 First inspection station
19 Second inspection station
21 Third inspection station
23 Transfer device
25 Shaping roller
27 Roller motor; radial bearing
29 Roller rotational axis
32 Receptacle rotational axis
33 Controller
35 Circumferential direction
37 Radial direction
39 Axial direction
41 Radial linear motor
43 Axial linear motor
45 Translator of the radial linear motor; secondary part
47 Translator of the axial linear motor; primary part
49 Stator of the radial linear motor; primary part
51 Stator of the axial linear motor; secondary part
53 Roller carriage
55 Foundation
57 Screw connection
59 Roller arm
61 Ball bearing
63 Motor output shaft
65 Axial arm section
67 Radial arm section
69 Axial guide; linear guide
71 Radial guide; linear guide
73 Axial feed axis
75 Radial feed axis
77 Guide rail
79 Guide carriage
81 Grooves in the guide rail
83 Projections in the guide carriage
85 Guide piston
87 Guide cylinder
89 Measuring system
91 Measuring unit
93 Measuring strip
95 Measuring system carriage
97 Alignment rail

The invention claimed is:

1. A device for reshaping a rotating glass intermediate comprising:
at least one shaping roller, which is translationally displaceable into a shape-rolling contact with the glass intermediate for shaping,
at least one linear motor for the translational positioning of the at least one shaping roller, wherein the shaping roller directly follows a translational positioning movement of a translator of the linear motor, and
at least one measuring system with an optical measuring unit and a measuring strip for measuring the translational positioning movement of the translator, wherein the measuring unit or the measuring strip is fixedly connected to the translator in such a way that the measuring unit or the measuring strip directly follows the translational positioning movement of the translator, wherein an optical signal is projected from the measuring unit onto the measuring strip.

2. The device according to claim 1, comprising at least one roller motor for rotating the at least one shaping roller in shape-rolling contact, wherein the roller motor is fixedly connected to the translator in such a way that the roller motor directly follows the translational positioning movement of the translator.

3. The device according to claim 1, comprising at least one radial bearing, wherein the radial bearing is fixedly connected to the translator in such a way that the radial bearing directly follows the translational positioning movement of the translator.

4. The device according to claim 1, comprising at least one linear guide for guiding the translator and the at least one shaping roller along an axial feed axis, wherein the linear guide comprises a guide rail and a guide carriage, which are movable relative to one another along the feed axis, and wherein the translator is fixedly connected to the guide rail or the guide carriage in such a way that the guide rail or the guide carriage directly follows the translational positioning movement of the translator.

5. The device according to claim 4, wherein a part of the at least one linear guide fixedly connected to the translator is fixedly connected to a roller carrier displaceable along the feed axis.

6. The device according to claim 5, wherein the guide carriage or the guide rail is fixedly connected to the translator and is fixedly connected to the roller carrier displaceable along the feed axis.

7. The device according to claim 5, wherein the part of the at least one linear guide fixedly connected to the translator is fixedly connected to a roller carriage displaceable along the roller rotational axis and/or a roller arm displaceable transversely to the roller rotational axis, in such a way that the roller carrier directly follows the translational positioning movement of the translator.

8. The device according to claim 1, wherein the measuring strip is formed on a guide rail of a linear guide.

9. The device according to claim 1, wherein the measuring unit is connected to an alignment rail, which extends through a guide gap between a guide carriage and a guide rail of a linear guide for guiding the translator and the at least one shaping roller.

10. The device according to claim 1, wherein the translator of one of the at least one linear motor is translationally displaceable transversely to a roller rotational axis, about which the at least one shaping roller is rotatable, in order to put the at least one shaping roller into shape-rolling contact for shaping and remove the at least one shaping roller therefrom after shaping has taken place.

11. The device according to claim 10, wherein the translator of one of the at least one linear motor is translationally displaceable orthogonally or parallel to the roller rotational axis.

12. The device according to claim 1, wherein the translator of one of the at least one linear motor is translationally displaceable along a roller rotational axis, about which the at least one shaping roller is rotatable, in particular is translationally displaceable for glass mass compensation.

13. The device according to claim 1, wherein the at least one shaping roller comprises two shaping rollers, and the at least one linear motor comprises two linear motors, each comprising a translator, wherein each one of the two translators is in each case fixedly connected to one of the two shaping rollers in such a way that the respective shaping roller directly follows a translational positioning movement of the respective translator.

14. The device according to claim 13, wherein the two translators are connected to a respective shaping roller independently of one another in such a way that the two shaping rollers are translationally displaceable independently of one another.

15. The device according to claim 1, wherein the at least one linear motor comprises at least one linear motor with a translator translationally displaceable transversely to the roller rotational axis, and a linear motor with a translator displaceable along the roller rotational axis.

16. The device according to claim 10, wherein the optical signal is reflected from the measuring strip back to the measuring unit.

17. The device according to claim 10 wherein each of the at least one linear motor is connected to the at least one measuring system.

18. A system for producing a rotationally symmetrical glass product, said system comprising:

a) a receptacle for rotatably holding a glass intermediate, b) a device for reshaping the glass intermediate, the device comprising:

at least one shaping roller, which is translationally displaceable into a shape-rolling contact with the glass intermediate for shaping, at least one linear motor for the translational positioning of the at least one shaping roller, wherein the shaping roller directly follows a translational positioning movement of a translator of the linear motor, and at least one measuring system with an optical measuring unit and a measuring strip for measuring the translational positioning movement of the translator, wherein the measuring unit or the measuring strip is fixedly connected to the translator in such a way that the measuring unit or the measuring strip directly follows the translational positioning movement of the translator, wherein an optical signal is projected from the measuring unit onto the measuring strip, and c) a carousel for moving the receptacle to different manufacturing stations, or for moving the at least one shaping roller to different receptacles for glass intermediates.

19. The system for claim 18 wherein the carousel is able to move the at least one shaping roller to different receptacles.

* * * * *